United States Patent
Jamei (10) Patent No.: US 11,775,867 B1
(45) Date of Patent: Oct. 3, 2023

(54) SYSTEM AND METHODS FOR EVALUATING MACHINE LEARNING MODELS

(71) Applicant: System Inc., New York, NY (US)

(72) Inventor: Mehdi Jamei, Chappaqua, NY (US)

(73) Assignee: System Inc., New York, NY (US)

( * ) Notice: Subject to any disclaimer, the term of this patent is extended or adjusted under 35 U.S.C. 154(b) by 19 days.

(21) Appl. No.: 17/124,870

(22) Filed: Dec. 17, 2020

Related U.S. Application Data (60) Provisional application No. 62/949,700, filed on Dec. 18, 2019.

(51) Int. Cl.
*G06N 20/00* (2019.01)
*H04L 9/40* (2022.01)

(52) U.S. Cl.
CPC ............ *G06N 20/00* (2019.01); *H04L 63/08* (2013.01); *H04L 63/10* (2013.01); *H04L 63/105* (2013.01); *H04L 63/123* (2013.01)

(58) Field of Classification Search
CPC ......... H04L 63/10; H04L 63/08; H04L 63/14; H04L 63/123; H04L 63/126; G06N 20/00
USPC ................ 709/220, 224, 226, 227, 228
See application file for complete search history.

(56) References Cited

U.S. PATENT DOCUMENTS

| | | | |
|---|---|---|---|
| 7,940,685 B1 * | 5/2011 | Breslau | H04L 43/0858 709/224 |
| 9,503,466 B2 * | 11/2016 | Vasseur | H04L 47/127 |
| 2016/0098661 A1 * | 4/2016 | Viswanathan | G06Q 10/067 705/7.26 |
| 2017/0124487 A1 * | 5/2017 | Szeto | G06F 11/1448 |
| 2017/0174894 A1 * | 6/2017 | Chavali | H01L 23/147 |
| 2017/0177808 A1 * | 6/2017 | Irwin | G06Q 40/123 |
| 2017/0177809 A1 * | 6/2017 | Bull | G16H 50/30 |
| 2017/0178093 A1 * | 6/2017 | Bull | G06Q 20/10 |
| 2017/0178135 A1 * | 6/2017 | Bull | G06Q 20/40 |
| 2019/0121673 A1 * | 4/2019 | Gold | G06F 9/5027 |
| 2019/0209022 A1 * | 7/2019 | Sobol | A61B 5/0022 |
| 2019/0266418 A1 * | 8/2019 | Xu | G06V 10/457 |
| 2019/0286153 A1 * | 9/2019 | Rankawat | G05D 1/0246 |
| 2019/0384649 A1 * | 12/2019 | Wen | G06F 9/445 |
| 2021/0110288 A1 * | 4/2021 | Poothiyot | G06F 8/20 |
| 2021/0142177 A1 * | 5/2021 | Mallya | G06N 3/084 |

FOREIGN PATENT DOCUMENTS

| CA | 3062326 A1 * | 11/2018 | ............ G06N 20/00 |
|---|---|---|---|

\* cited by examiner

Primary Examiner — Khanh Q Dinh
(74) Attorney, Agent, or Firm — FisherBroyles LLP; Alan D. Minsk (57) ABSTRACT

A system and methods to provide an independent and unbiased service that comprehensively analyzes the performance of a predictive machine learning model and enables the performance characteristics of the model to be compared to other models and to relevant benchmarks.

18 Claims, 7 Drawing Sheets

SYSTEM AND METHODS FOR EVALUATING MACHINE LEARNING MODELS

CROSS REFERENCE TO RELATED APPLICATIONS

This application claims the benefit of U.S. Provisional Application No. 62/949,700, entitled "System and Methods for Evaluating Machine Learning Models," filed Dec. 18, 2019, the disclosure of which is incorporated in its entirety (including the Appendix), by this reference.

Note that references to "System" in the context of a data processing architecture or to the "System" platform herein refer to the architecture, platform, and processes for performing statistical search and other forms of data organization and discovery described in U.S. patent application Ser. No. 16/421,249, entitled "Systems and Methods for Organizing and Finding Data", filed May 23, 2019, which claims priority from U.S. Provisional Patent Application Ser. No. 62/799,981, entitled "Systems and Methods for Organizing and Finding Data", filed Feb. 1, 2019, the entire contents of both of which are incorporated in their entirety into this application by this reference.

BACKGROUND

Machine learning (ML) includes the study of algorithms and statistical models that computer systems use to perform a specific task without using explicit instructions, relying instead on identifying patterns and applying inference processes. It is generally considered a subset of the more general field of artificial intelligence (AI). Machine learning algorithms build a mathematical "model" based on sample data (known as "training data") and information about what the data represents (termed a label or annotation), in order to make predictions, classifications, or decisions without being explicitly programmed to perform the task.

Machine learning algorithms are used in a variety of applications, including email filtering and computer vision, where it is difficult or not feasible to develop a conventional algorithm to effectively perform the task. Because of the importance of the ML model being used for a task, researchers and developers of machine learning based applications spend time and resources to build the most "accurate" predictive models for their particular use case. The evaluation of a model's performance and the importance of each feature in the model are typically represented by specific metrics that are used to characterize the model and its performance. These metrics may include, for example, model accuracy, the confusion matrix, Precision (P), Recall (R), Specificity, the F1 score, the Precision-Recall curve, the ROC (Receiver Operating Characteristics) curve, or the PR vs. ROC curve. Each metric may provide a slightly different way of evaluating a model or certain aspect(s) of a model and its performance.

However, the metrics by which models and features are evaluated may change over time as more is learned about how machine learning algorithms (and hence the models that result from applying those algorithms) operate and the sensitivity of a particular metric to errors in training data or annotations. In these situations, a new analysis/evaluation metric may be proposed to more accurately characterize a model and the importance or relevance of its features. In addition, as a greater number of metrics are proposed and used for evaluating models, one or more may become accepted as the "standard" way of characterizing a model's performance and models will be expected to be associated with that metric. Furthermore, in a conventional model evaluation approach, it is typical for the creator of a model to evaluate their model and its features with reference to metrics that present the performance of the model in the best light, instead of using a (potentially) less-biased or more generally accepted set of metrics.

Thus, the conventional approaches to evaluating the performance of a machine learning model have at least two significant disadvantages: (1) evaluation metric staleness or incompleteness; and (2) model developer bias, potentially leading to an incomplete or inaccurate, and hence less reliable evaluation result.

Systems and methods are desired for more accurately and reliably characterizing the performance of a machine learning model. Embodiments of the invention described herein are directed toward solving these and other problems individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification of this patent, to any or all figures or drawings, and to each claim.

As noted, conventional approaches to evaluating the performance of a machine learning model have at least two important disadvantages: (1) evaluation metric staleness or incompleteness; and (2) model developer bias, potentially leading to an incomplete, unreliable or inaccurate evaluation result. These and other disadvantages of conventional approaches are overcome by one or more embodiments of the system and methods described herein.

Embodiments of the disclosure are directed to systems, apparatuses, and methods for more effectively, reliably and accurately evaluating the performance of a machine learning model. In some embodiments, this is achieved by use of an evaluation platform to which a data scientist or model developer can upload a model that they wish to have evaluated. Prior to applying a series of "tests" or evaluations, the model is converted to a form or representation that is language agnostic, meaning that it is independent of the particular computer language used by the data scientist to develop and train the model. The converted model and a training data set used by the developer (which may also be processed to place it into a standardized format) are uploaded to the platform where one or more tests and/or evaluations are applied to the model. In some embodiments, the conversion of the model and/or the set of training data may be performed on the platform instead of prior to uploading to the platform.

In some embodiments, the tests or evaluations applied to a model may be (a) selected by the model developer from a list of available tests, (b) selected by the platform operator as representing a standard set of tests employed in the industry for evaluating such models, or (c) by reference to a set of tests used to evaluate certain other models (such as those intended to be used to perform a similar task to the model being evaluated). The results of the tests and/or evaluations are made available to the data scientist through a portal, enabling the developer of a model to evaluate its performance and compare it to other models using a standard and uniform set of metrics or benchmarks.

In some embodiments, the disclosure is directed to a method for testing and evaluating a machine learning model. The method may include receiving a request to evaluate a trained machine learning model at a server operated by a provider of a machine learning model evaluation service; receiving the trained machine learning model and a set of training data used to train the model at the server; determining a set of one or more tests to perform to evaluate the trained machine learning model; enabling the set of tests to be performed and associated with the request, wherein the set of tests comprises one or more of generating model performance metrics, feature importance metrics, partial dependence plots, interaction metrics between different features, and descriptive statistics; performing each test of the set of tests on the trained machine learning model, wherein performing a test generates an evaluation metric; and providing each of the generated evaluation metrics to a sender of the request.

Embodiments of the disclosure are also directed to a system or apparatus comprising a processor that when programmed with a set of computer-executable instructions, is configured to execute a method for testing and evaluating a machine learning model. Additional embodiments are directed to a set of one or more non-transitory computer-readable media comprising a set of computer-executable instructions that when executed by one or more programmed electronic processors, cause the processors to implement a method for testing and evaluating a machine learning model.

Other objects and advantages of the present disclosure will be apparent to one of ordinary skill in the art upon review of the detailed description and the included figures.

BRIEF DESCRIPTION OF THE DRAWINGS

Embodiments in accordance with the present disclosure will be described with reference to the drawings, in which.

Note that the same numbers are used throughout the disclosure and figures to reference like components and features.

DETAILED DESCRIPTION

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments will be described more fully herein with reference to the accompanying drawings, which form a part hereof, and which show, by way of illustration, exemplary embodiments by which the invention may be practiced. The invention may, however, be embodied in different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), or other form of computing or data processing system, device, or platform.

The processing element or elements may be programmed with a set of executable instructions (e.g., software instructions), where the instructions may be stored in (or on) a suitable non-transitory data storage element. In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

Embodiments of the system and methods described herein (termed the "Evaluator" or "Model Evaluator") provide an independent and unbiased service that comprehensively analyzes the performance of a predictive machine learning model and enables the performance characteristics of the model to be compared to other models and to relevant benchmarks. Among other benefits, it has the following advantages:

Administrators (e.g., data science managers, a provider of the described model evaluation services, etc.) can add new types of analyses and evaluations to the system. This can be important, because as metrics of interest change over time, the Evaluator service platform can be updated to maintain a currently recognized and comprehensive set of evaluation tools, metrics and evaluation processes. This enables the Evaluator to run comprehensive analyses of machine learning models and to enable an effective comparison of one model's performance with another's and/or with relevant benchmarks. The Evaluator is backward-compatible and is capable of evaluating previously built models, and applying new metrics to update a previous evaluation of a model;

Evaluator enables a comparison between different models that predict the same target (i.e., perform the same classification process or task, for example). Since the Evaluator can be used to apply the same set of metrics for the evaluation of multiple models, it allows a developer or other party to more reliably compare various models;

Evaluator's analyses are reliable and unbiased. This is because the creator of a model does not select specific metrics to report (which may create a more favorable impression of the performance of their model);

In many cases, Evaluator provides a more in-depth analysis than conventional model evaluation methods. Even if the creator of a model is not familiar with a specific type of analysis (such as PDP, SHAP (the SHapley Additive exPlanation (SHAP) framework), etc.), the Evaluator platform can apply that metric or analysis method and produce a more complete evaluation of a model; and The Evaluator is version, library and language agnostic. Regardless of what language, library, or version of a language is used to create and train a model, Evaluator can perform the same set of analyses. This provides a common set of metrics that may be used to compare the performance and characteristics of different models.

In some embodiments, a specific data format, known as machine-learning exchange (e.g., ONNX or Open Neural Network Exchange), is used in a process that converts various types of models and libraries into a uniform schema. Using ONNX or a similar format allows Evaluator to be independent of the libraries and languages that may have been used to train different models. Alternatives to using ONNX include, but are not limited to, Predictive Model Markup Language (PMML) and Neural Network Exchange Format (NNEX).

Below is a partial list of the tests or evaluation metrics that an embodiment may apply to a machine learning model. Note that the set of tests or metrics available for evaluating models may change as new metrics or evaluation methods are developed or modified, or are found to be relevant by researchers and model developers. In one embodiment, the Evaluator system has access to a library of various types of model analyses and evaluation processes (some of which may depend on open source libraries). If desired, a user can add new metrics and analyses to this library and those can be selected and executed as part of evaluating future models submitted by the user.

In some embodiments, the Evaluator system library of tests or metrics may be updated, modified or revised by the entity providing the Evaluator service; this may result from a review of current literature regarding machine learning model testing, suggestions received from model developers, performing searches to find test metrics associated with models, etc.

| Analysis Family | Regressors | Classifiers |
| --- | --- | --- |
| Model Performance | R2 Score<br>Mean Squared Error<br>Mean Absolute Error | Receiver Operating Characteristic (ROC)<br>Area under the curve of ROC<br>F1 Score<br>Accuracy Score<br>Confusion Matrix |
| Model Algorithm and preprocessing | Preprocessing steps<br>Algorithm | Preprocessing steps<br>Algorithm |
| Global Feature Contribution | Permutation Score<br>Global SHAP score | Permutation Score<br>Global SHAP score |
| Local Feature Contribution | Partial Dependence Plots<br>SHAP plots | Partial Dependence Plots<br>SHAP plots |
| Feature Interactions | Pearson R<br>Kendall Tau<br>Cramer's V<br>Kruskal H-Test | Pearson R<br>Kendall Tau<br>Cramer's V<br>Kruskal H-Test |
| Feature descriptive statistics | iqr<br>kurtosis<br>mode<br>Mean<br>median<br>n_missing<br>p_missing<br>count<br>etc. | iqr<br>kurtosis<br>mode<br>Mean<br>median<br>n_missing<br>p_missing<br>count<br>etc. |

Figure 1:
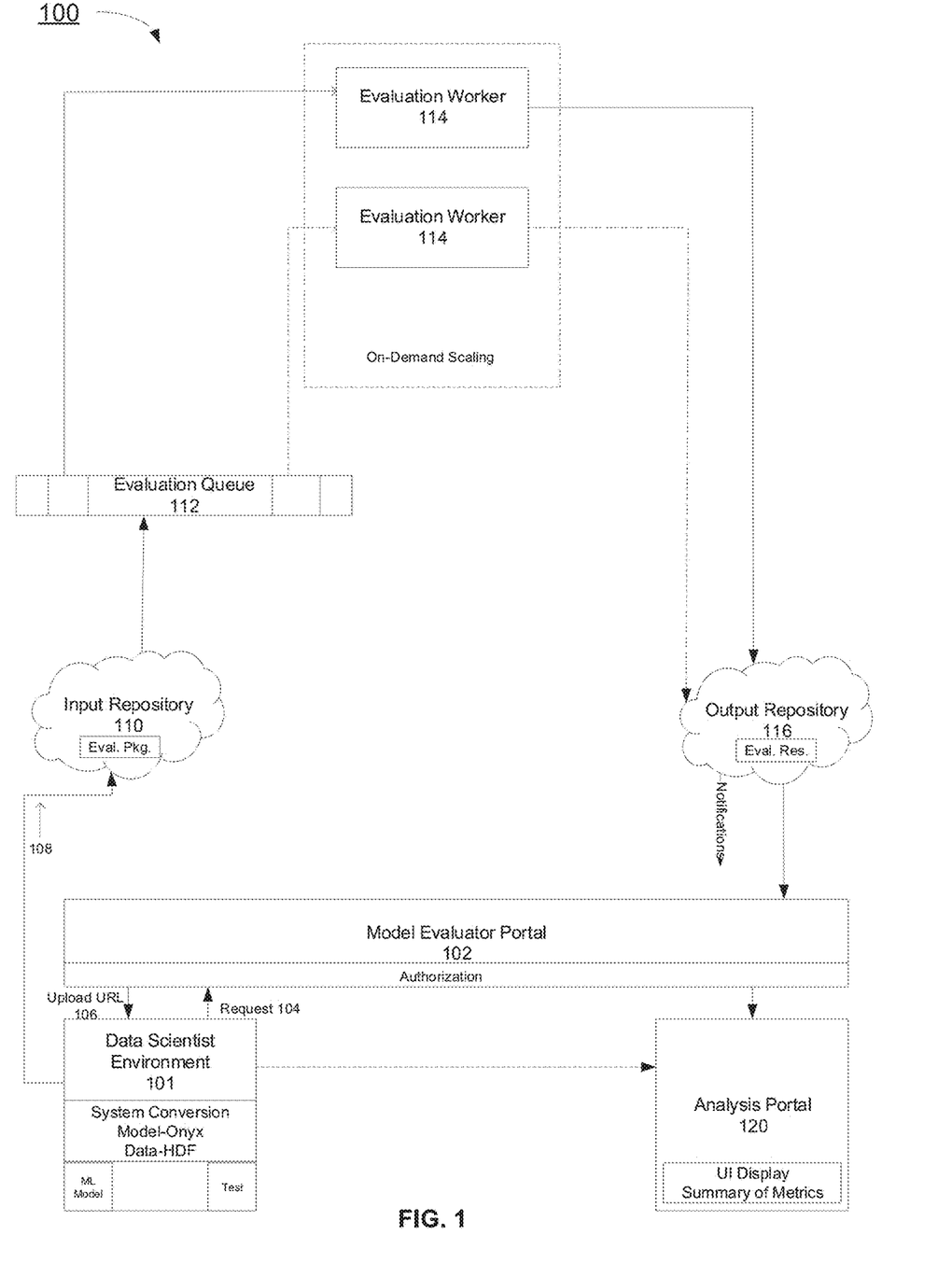
FIG. 1 is a diagram illustrating the primary elements or functions of an example system for evaluating a machine learning model, in accordance with some embodiments of the systems and methods described herein.

FIG. 1 is a diagram illustrating the primary elements or functions of an example system 100 for evaluating a machine learning model, in accordance with some embodiments of the systems and methods described herein. The diagram illustrates an on-demand, cloud-based (SaaS or multi-tenant platform) embodiment of the Evaluator service or system. Note that the containerization of the evaluation code-base allows for on-demand scaling of the evaluation processes to provide a cost-efficient and reliable service.

Upon a "submission" by a user (of a combination of a model and a dataset used by the model developer to train the model), a new container (that is, a new instantiation or other form of enabling a set of model evaluation services within a specific user's account) is created and assigned to that submission. Each container is independent of other containers and is accessed by and executed (i.e., the model is tested) using an independent infrastructure provided within an isolated and independent account on a multi-tenant platform or SaaS architecture. This architecture provides scalability as the number of incoming submissions increases. The illustrated architecture also enables an administrator of the platform or provider of the model evaluation services to monitor and/or impose limits on total CPU and data storage usage for each account/user. This ability can be used for purposes of load balancing and differentiated pricing of the service(s) available through the platform.

Each testing container (or "worker") logs the resources that it uses to evaluate a submitted model. This includes required RAM, CPU memory, processing time, data storage, network traffic to transfer the data, etc. The log data is aggregated by user ID and used for billing and enforcement of limits or quotas set on resource use. This allows for a system in which each user pays for the amount of services that they use as part of the model evaluation processes.

As shown in the figure, system 100 includes a model evaluator portal 102. Portal 102 provides an interface for a data scientist or other developer of a model to access the services of the Evaluator platform. Typically, a potential user will submit a request 104 to Portal 102 for evaluation services using the Evaluator platform client (or one associated with the "System" architecture for constructing and searching a data structure). In response, Portal 102 may perform an initial authentication or verification process to determine if the user making the request is authorized to access the Evaluator service. If the user is authorized (such as by having an active account and presenting the correct credentials), then Portal 102 responds to the request by providing an upload URL 106 (or other form of link or location identifier, such as an address) to the client.

The client application validates the received URL and uploads the evaluation package (the ML model and data set) to the provided URL (as suggested by path 108). Note that prior to the upload (or on the service platform after the upload), the Evaluator system may perform certain data format conversions and/or processing of the user's machine learning model and/or training data, as suggested by the "System Conversion" element of the figure. As an example, the model may be converted into a representation expressed in ONNX and the data may be converted into a representation expressed in HDF, or hierarchical data format. After the evaluation package is uploaded to the Input Host Repository 110, the package is placed into an Evaluation Queue 112.

Each package or task is then directed to an Evaluation Worker 114. An Evaluation Worker is an instance or instantiation (or other form of enabling) of the Evaluator system functions and processes for use by (or within) an account and can be used independently of other instances. Because each container (i.e., worker) is independent and does not share resources with other workers, the number of submissions to the platform does not overwhelm or slow down the processing applied to the specific model being evaluated within the container. Worker 114 executes the model evaluation "tests" on the model and in response generates a set of evaluation results, which are provided to an Output Repository 116. The Evaluator results are provided to Portal 102 which makes them available to the user via an Analysis Portal 120 (as suggested by the dashed line between Data Scientist Environment 101 and Analysis Portal 120). Analysis Portal 120 may provide a user with one or more visualizations, tables, lists, graphs or other forms of presenting the results of the model evaluation.

The information or analysis results that may be presented to a user as results of the evaluation of a ML model include, but are not limited to or required to include:

1—A list of model performance metrics (such as F1 score, R2 score, ROC and PR curves, Confusion Matrix, etc.);
2—A list of feature importance metrics (such as permutation scores, gain, SHAP values, etc.);
3—Partial Dependence plots for each feature;
4—Interaction metrics between different features (such as correlation—Pearson R, Kendall Tau, etc.); and
5—Descriptive statistics (where relevant) for features, such as mean, median, standard deviation.

Figure 2:
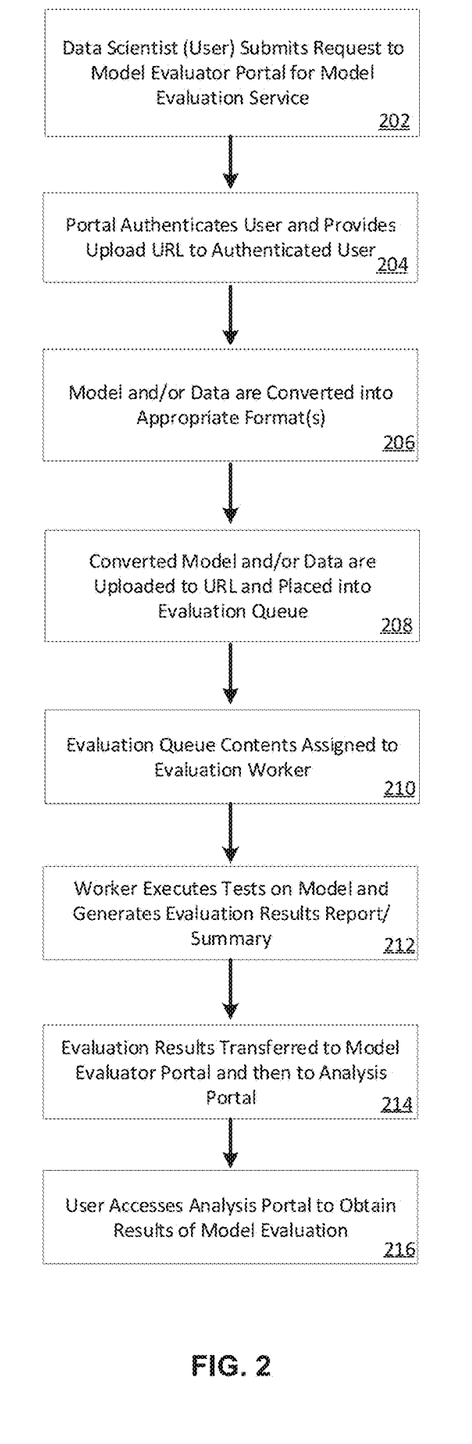
FIG. 2 is a diagram illustrating a process, method, function or operation for evaluating a machine learning model, in accordance with some embodiments of the systems and methods described herein.

FIG. 2 is a flowchart or flow diagram illustrating a process, method, operation or function for providing an evaluation of a machine learning model using an embodiment of the Evaluator system described with reference to FIG. 1. As shown in the figure, in an example use case, a user (such as a data scientist or researcher) submits a request for service to the Model Evaluator Portal (step 202). The portal responds by authenticating or verifying the user (typically by means of user-provided credentials, although other methods are possible, such as the transfer of a token), as suggested by step 204. After the user is authenticated, the Portal provides the user with an upload link for use in providing the model and data to the Evaluator platform.

Prior to uploading of the model and training data, one or both may be subject to certain processing and/or data formatting operations, as suggested by step 206. This may include but is not required to include (or limited to including) model pre-processing to convert the model into a common language (such as ONNX) and/or data pre-processing to convert the data into hierarchical data format (HDF). As mentioned, these or similar conversions or formatting operations enable the Evaluator system described herein to be largely or completely agnostic with regards to model language, version, libraries, initial data format, etc. As also mentioned, in some embodiments, the conversions may be performed on the Evaluator system platform, with the conversion processing being performed as part of configuring the model evaluation/testing processes for a specific user.

After the conversions and/or formatting operations, the model and data are uploaded to the provided URL (or other form of indicating a desired address or location of a processing system) and placed into an Evaluation Queue (step 208). The Evaluation Queue assigns the task of evaluating the model to an Evaluation Worker (step 210). The assignment may be based on any suitable decision process or protocol—FIFO, a ranking based on expected computational load, whether the source of the model has paid for prioritized evaluations, the next available Evaluation Worker, etc. The Evaluation Worker executes a set of tests or evaluation processes on the model and generates an evaluation results report or summary (step 212). The model evaluation results report or summary is provided to the Model Evaluator Portal and then to an Analysis Portal (step 214). The user accesses the Analysis Portal to obtain the results of the evaluation, which may include graphs, tables, visualizations, etc. (step 216). The graphs, tables or visualizations may include one or more of a list of the metrics computed and their respective values, a graph illustrating the value of metrics over time or over each iteration of the model, a chart or visualization illustrating how the evaluated model compares to others intended for the same task, or to a previous version of the model, etc.

Below is a further description of certain aspects of the system and methods described herein, certain benefits of the system, and how the Evaluator service may be used/deployed to evaluate a model and also to enhance other processes:
- When deployed as a remote architecture (e.g., multi-tenant, SaaS, IaaS), the architecture reduces the burden on local computational resources—since the models and their evaluation can be computationally-intensive, this is a benefit to users, particularly those lacking regular access to the computational resources needed:
  - Note that because some of the types of model analysis are computationally "expensive" to run locally, model creators tend to report partial analyses (for example, they rarely report PDP (the partial dependence plot));
- The Evaluator architecture enables use cases that might otherwise not be available:
  - This is because some types of tests may not be available for a specific language/library. For example, Evaluator tests include SHAP value analyses which, at present, are only available for Python language and for certain libraries. In this respect, Evaluator will enable R users (and users of other languages) to have access to SHAP analyses;
  - The Evaluator system/platform architecture enables an administrator to periodically deploy new algorithms to compute feature importance or other model characteristics, without users having to concern themselves with learning these algorithms or updating their model evaluation toolkit;
- The output and/or other functions of the model Evaluator service can be integrated with aspects of the "System" architecture (for which patent and trademark applications have been filed and assigned to the assignee of the present application) to obtain new or improved services. "System" compares and aggregates relationships from a heterogeneous set of statistical models. The Evaluator service enables and facilitates this aggregation by providing uniform performance analyses of those models and assists "System" to provide a variety of services, such as one or more of the following:
  - identifying those data sets most useful for training a specific type of model;
  - providing recommendations on factors related to a topic of interest (e.g., by using the statistical search functionality described in the patent applications incorporated by reference herein);
  - providing transparent and detailed information about the accuracy and performance of ML models on the "System" platform;
  - assist users to compare different models (because the models can be evaluated using the same performance metrics);
  - assist users to rank the importance of different features across different models (because the analysis of different models reports the same feature importance metrics);
  - assist a user to find relevant and useful datasets because they have access to the descriptive statistics of features in those datasets (as calculated via the Evaluator);
  - when multiple (and potentially contrary) evidence for the existence and strength of a statistical relationship between two topics (e.g., consumption of red meat and risk of heart attack) exists, a meta-analysis (i.e., summary) of the evidence can be created if comparable or similar metrics are reported for the evidence.
  - Evaluator standardizes such metrics and enables "System" to reliably compare and summarize statistical relationships;
- the breadth of analyses produced by the Evaluator platform enables the "System" architecture (i.e., the search platform operated by the assignee) to have better data on the importance of each feature to a given prediction. This is because Evaluator generates a standard set of measures that can subsequently be used by the "System" architecture to determine the strength and reliability of relationships found in a submitted machine learning model. When combined with data gathered from other models trained on similar datasets and topics, "System" can, with higher confidence, determine the existence, strength and reliability of evidence for a statistical relationship between given topics:
  - this will help to generate better recommendations of predictive features and datasets that may contain them when using the Statistical Search functionality described in U.S. patent application Ser. No. 16/421,249, entitled "Systems and Methods for Organizing and Finding Data", filed May 23, 2019, which claims priority from U.S. Provisional Patent Application Ser. No. 62/799,981, entitled "Systems and Methods for Organizing and Finding Data", filed Feb. 1, 2019, the entire contents of both of which are incorporated by reference in their entirety into this application;
  - this also enables the "System" architecture to compare models and compute values algorithmically, such as the "strength" of a statistical relationship. Effective and reliable model performance comparison is possible when a comparable set of metrics are reported. Evaluator can perform a similar set of analyses for each of a set of submitted models and thus enables such comparisons;
- The Evaluator service is effectively language agnostic:
  - An initial step in the analysis performed by Evaluator is a conversion of the trained machine learning model to the ONNX or a similar general format. Once a model is converted to ONNX, it becomes, in effect, language agnostic and interoperable:
    - A benefit of the approach described herein is that in a company, the data scientists may have different toolkits (e.g., R vs Python) and using the approach described they can have access to a standard set of model tests and comparison tools that are independent of their language of choice. Presently, they do not have the same access, as not all tools are available across different languages.

Figure 3:
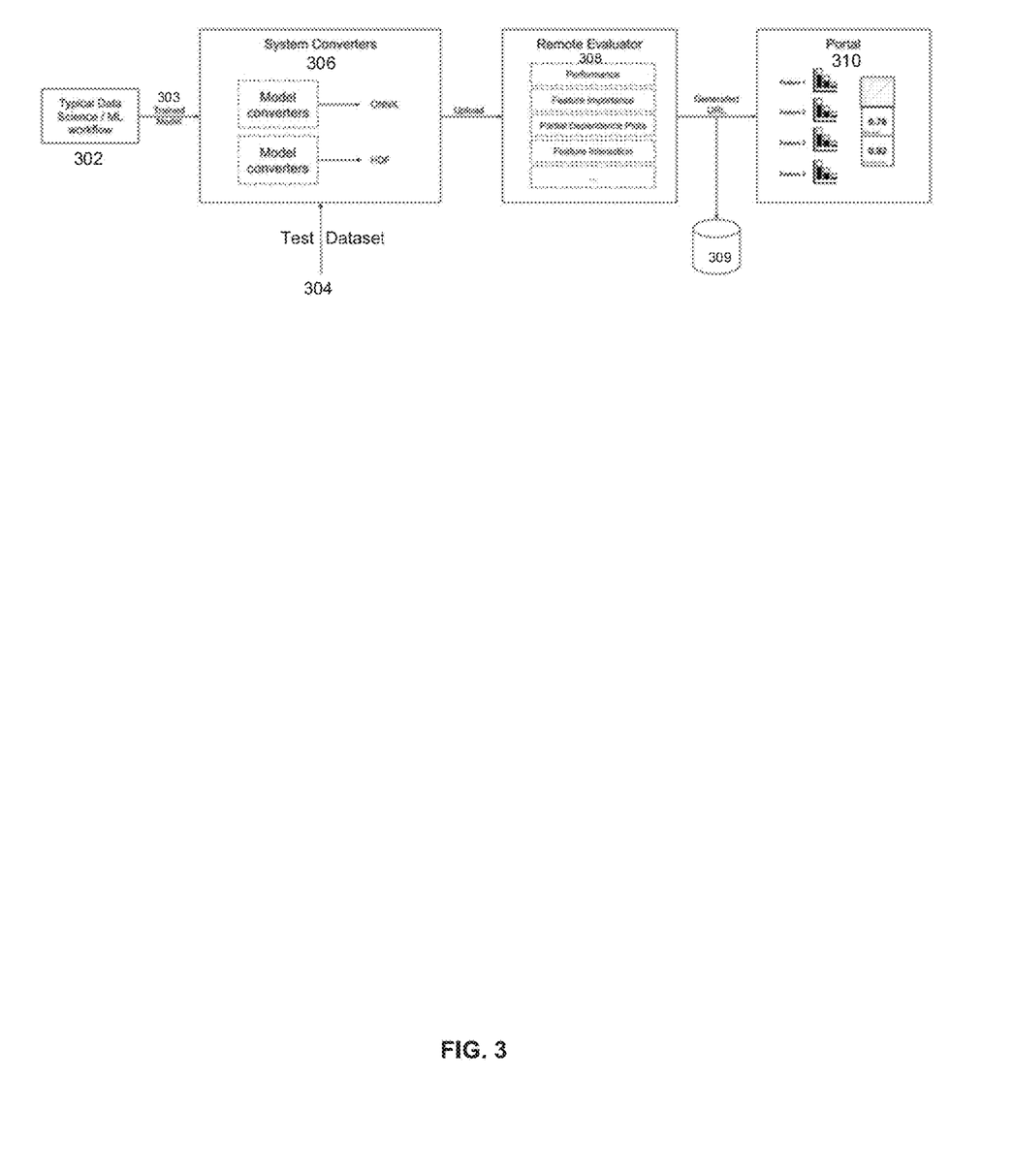
FIG. 3 is a flowchart or flow diagram showing the order of operations for a typical use case, in accordance with some embodiments of the systems and methods described herein.

FIG. 3 is a flowchart or flow diagram showing the order of operations for a typical use case, in accordance with some embodiments of the systems and methods described herein. As shown in the figure, a data scientist, researcher or other type of model developer 302 develops a model and trains it using a set of training data (and typically, a set of annotations or labels identifying the "correct" response the model should output). A trained model 303 and the training dataset 304 are then provided to a Converter 306 process which operates to convert the model and the dataset to a form or format for further evaluation. The converter processing may take place on a user's client device or workstation or within the user's "container" on the remote service platform. In one embodiment, the model is converted to ONNX and the dataset is converted to HDF. The converted model and dataset are then uploaded to the Evaluator platform (if not already available there) where one or more of a set of evaluations, analyses, or tests are executed. Examples of such evaluations, analyses, or tests are shown in the figure (Performance, Feature Importance, Partial Dependence Plots, Feature Interaction). The results or outputs of the evaluations, analyses, or tests are provided to a user via a Portal 310 and may also be stored in a datastore 309.

Figure 4:
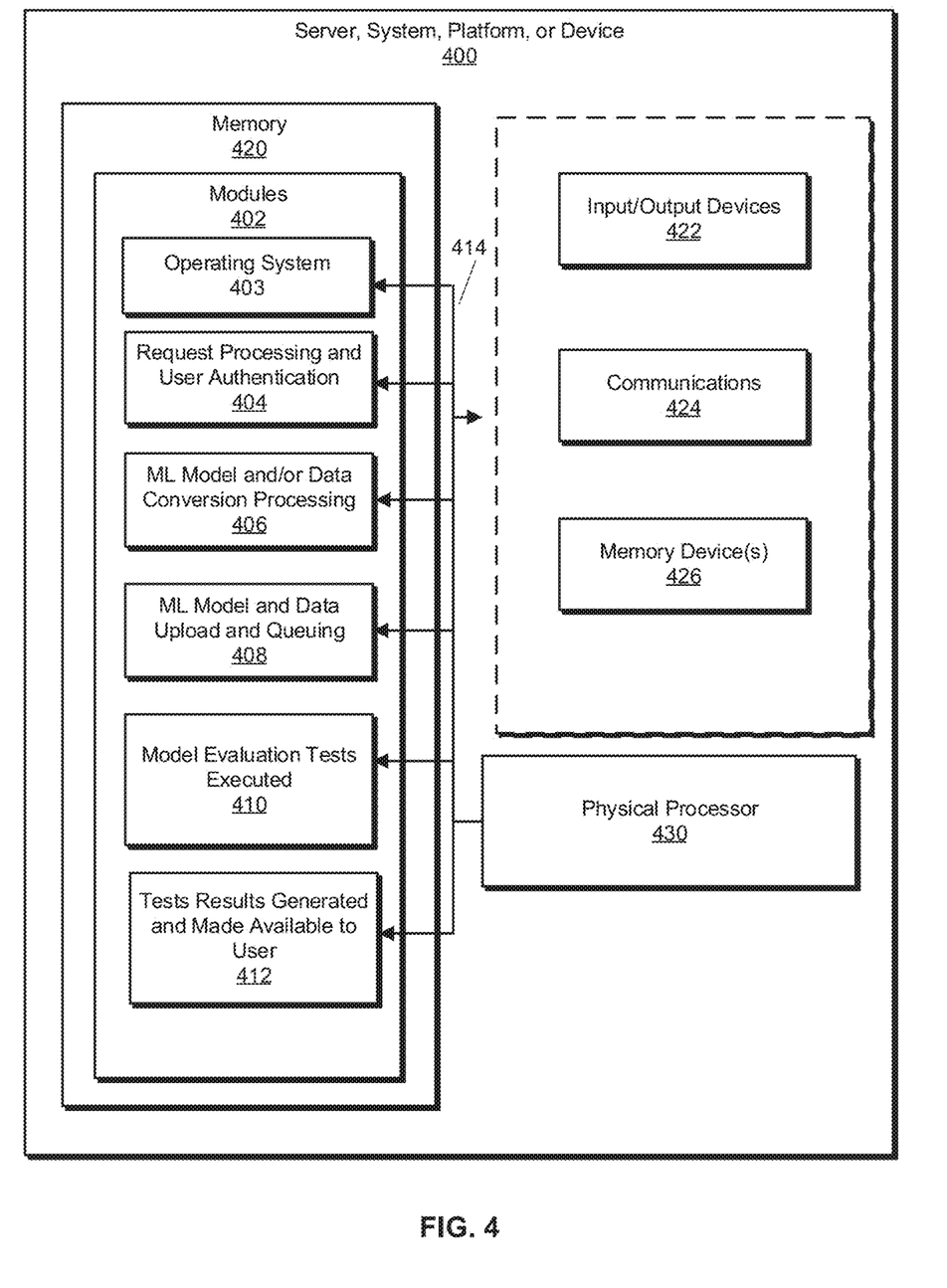
FIG. 4 is a diagram illustrating elements or components that may be present in computing device, server, platform or system configured to implement a method, process, function, or operation for evaluating a machine learning model in accordance with some embodiments of the systems and methods described herein.

FIG. 4 is a diagram illustrating elements or components that may be present in a computing device, server, platform or system configured to implement a method, process, function, or operation for evaluating a machine learning model in accordance with some embodiments. As noted, in some embodiments, the inventive system and methods may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a GPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the inventive system and methods described herein.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As described, the system, apparatus, methods, processes, functions, and/or operations for implementing an embodiment of the invention may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 4 is a diagram illustrating elements or components that may be present in one or more of a computing device, workstation, server, platform or system 400 configured to implement a method, process, function, or operation in accordance with an embodiment of the invention. Note that the functions performed by execution of the instructions contained in Modules 402 may be the result of the execution of a set of instructions by an electronic processing element located in a remote server or platform, a client device, or both (e.g., some of the instructions contained in a module may be executed by a processor in a client device with others executed by a processor in a remote server).

The subsystems shown in FIG. 4 are interconnected via a system bus 414. Additional subsystems include may include input/output devices 422, communications elements 424, and additional memory or data storage devices 426. The interconnection via the system bus 414 allows one or more electronic processors 430 to communicate with each subsystem and to control the execution of instructions that may be stored in a module 402 in memory 420, as well as the exchange of information between subsystems. The system memory 420 and/or the memory devices 426 may embody a tangible, non-transitory computer-readable medium.

Modules 402 each may contain a set of computer-executable instructions, which when executed by a programmed processor 430 (shown as "Physical Processor" in the figure) will cause server or device 400 to perform one or more operations or functions. As mentioned, typically modules 402 include an operating system 403 which performs functions involved in accessing and transferring sets of instructions so that the instructions may be executed. Modules 402 may further include Request Processing and User Authentication module 404 (which contains instructions which when executed perform some or all of the operations associated with steps 202 and 204 of FIG. 2), ML Model and/or Data Conversion Processing module 406 (which contains instructions which when executed perform some or all of the operations associated with step 206 of FIG. 2), ML Model and Data Upload and Queuing module 408 (which contains instructions which when executed perform some or all of the operations associated with steps 208 and 210 of FIG. 2), Model Evaluation Tests Executed module 410 (which contains instructions which when executed perform some or all of the operations associated with step 212 of FIG. 2), and Tests Results Generated and Made Available to User module 412 (which contains instructions which when executed perform some or all of the operations associated with step 214 of FIG. 2).

Figure 5:
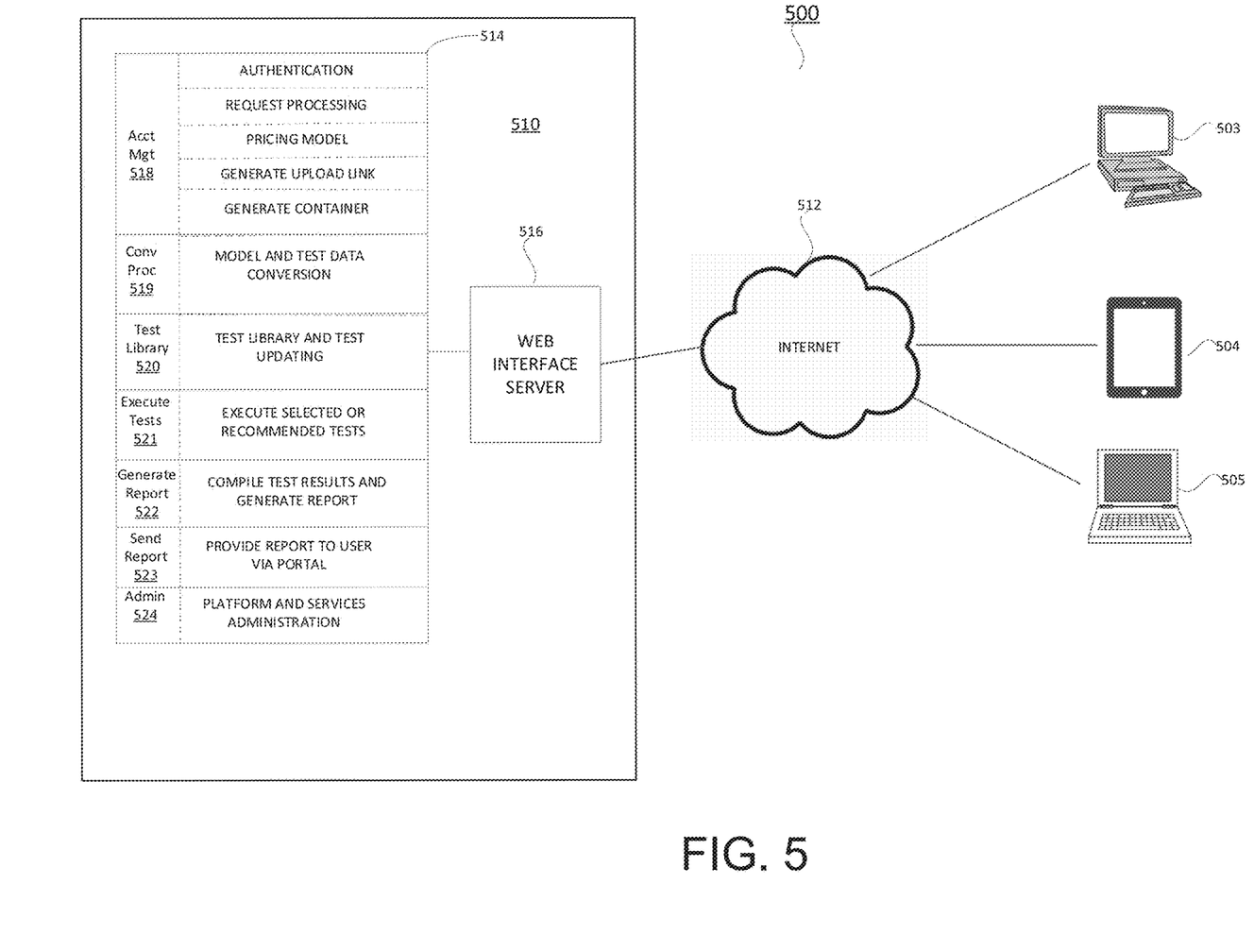
FIGS. 5-7 are diagrams illustrating an architecture for a multi-tenant or SaaS platform that may be used in implementing some embodiments of the systems and methods described herein.
Figure 6:
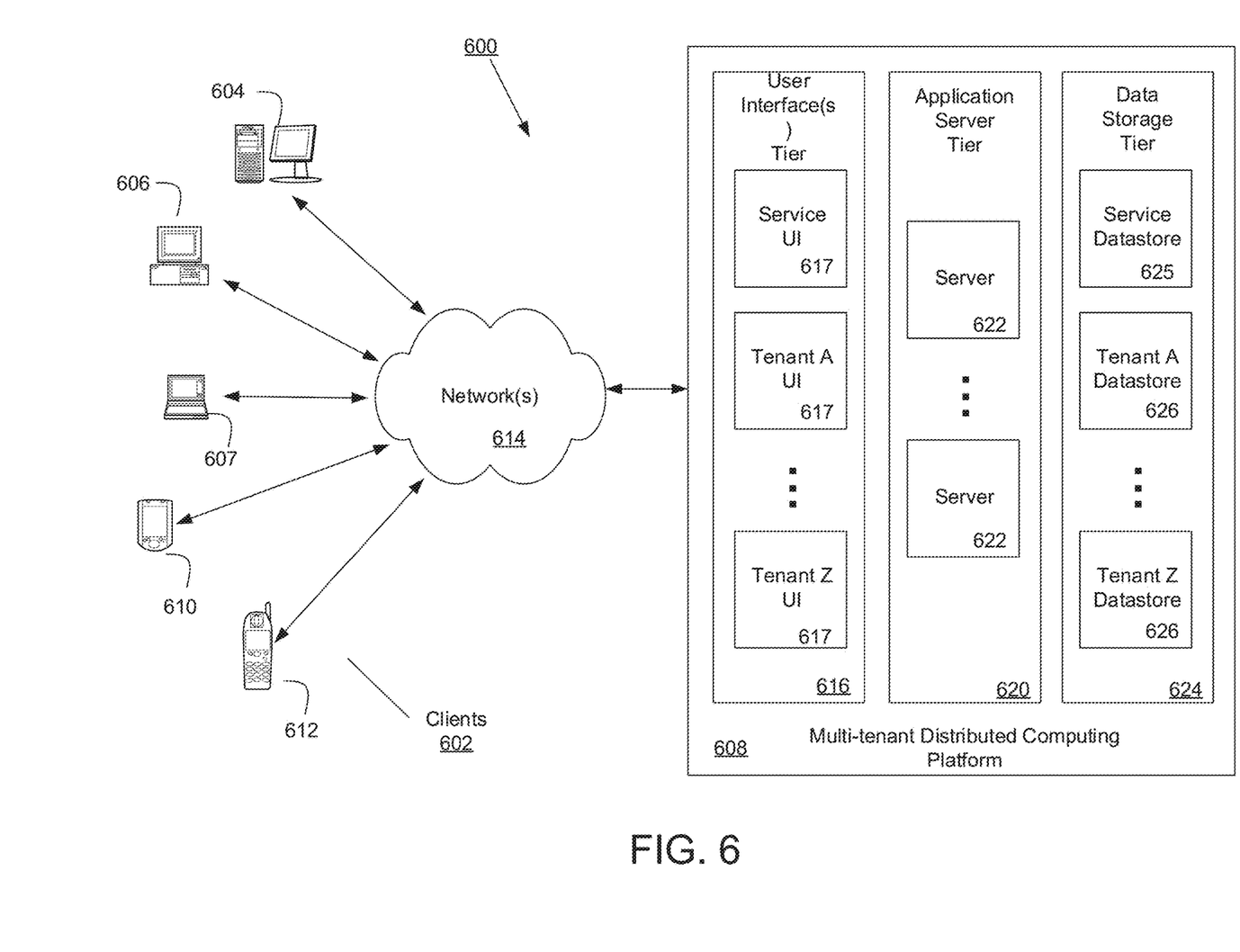
Figure 7:
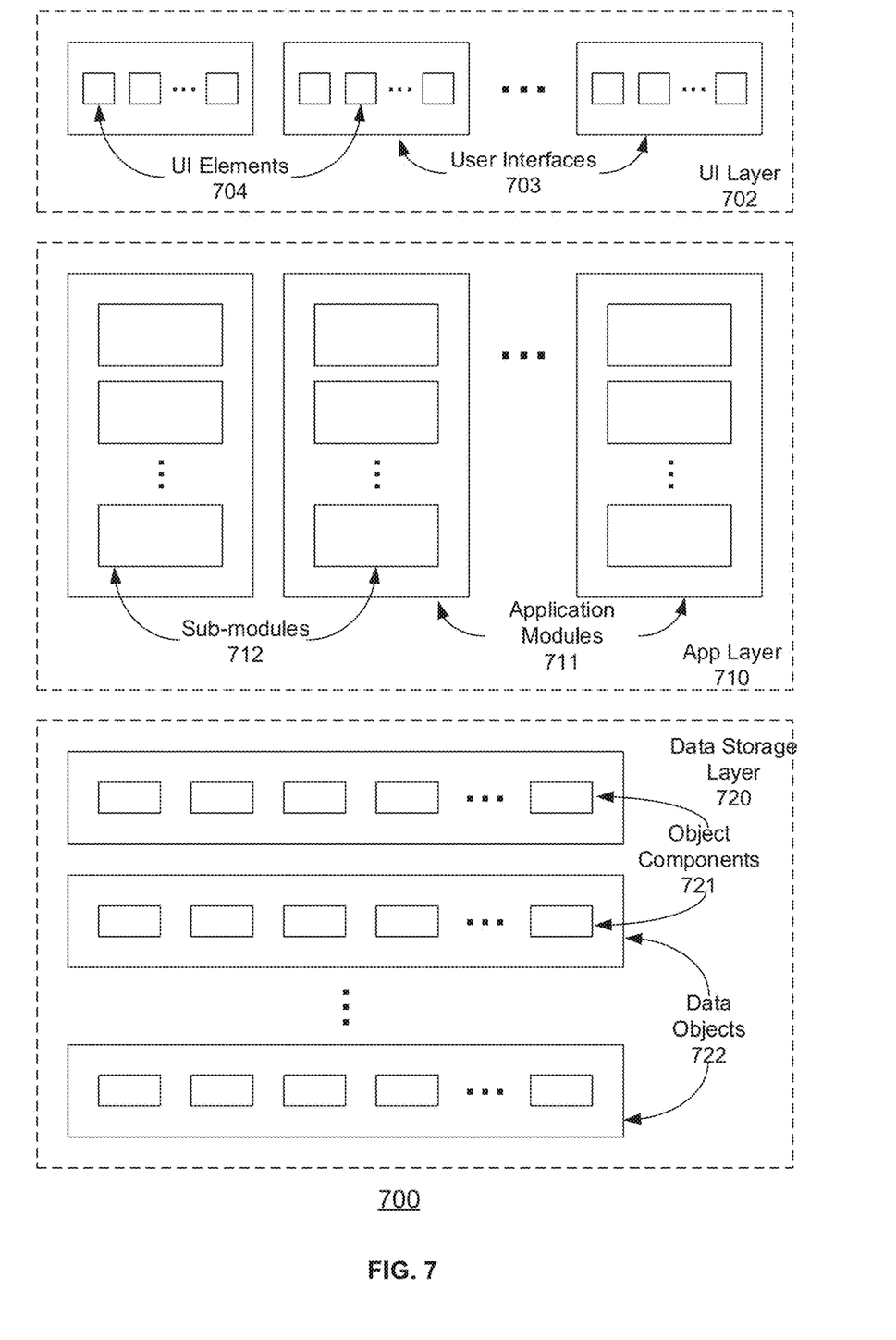

In some embodiments, the functionality and services provided by the system and methods described herein may be made available to multiple users by accessing an account maintained by a server or service platform. Such a server or service platform may be termed a form of Software-as-a-Service (SaaS). FIG. 5 is a diagram illustrating a SaaS system in which an embodiment of the invention may be implemented. FIG. 6 is a diagram illustrating elements or components of an example operating environment in which an embodiment of the invention may be implemented. FIG. 7 is a diagram illustrating additional details of the elements or components of the multi-tenant distributed computing service platform of FIG. 6, in which an embodiment of the invention may be implemented.

In some embodiments, the ML model evaluation system or service described herein may be implemented as micro-services, processes, workflows or functions performed in response to the submission of a subject document. The micro-services, processes, workflows or functions may be performed by a server, data processing element, platform, or system. In some embodiments, the model evaluation services may be provided by a service platform located "in the cloud". In such embodiments, the platform is accessible through APIs and SDKs. The ML model evaluation services may be provided as micro-services within the platform. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 5-7 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide the machine learning model evaluation and testing services described herein. Although in some embodiments, a platform or system of the type illustrated in FIGS. 5-7 may be operated by a 3d party provider to provide a specific set of business-related applications, in other embodiments, the platform may be operated by a provider and a different business may provide the applications or services for users through the platform.

FIG. 5 is a diagram illustrating a system 500 in which an embodiment of the invention may be implemented or through which an embodiment of the model evaluation services described herein may be accessed. In accordance with the advantages of an application service provider (ASP) hosted business service system (such as a multi-tenant data processing platform), users of the services described herein may comprise individuals, businesses, stores, organizations, etc. User may access the model evaluation services using any suitable client, including but not limited to desktop computers, laptop computers, workstations, tablet computers, etc. In general, any client device having access to the Internet and suitable data storage and uploading capability may be used to provide a trained model and/or training dataset to the platform for evaluation. Users interface with the service platform across the Internet 512 or another suitable communications network or combination of networks. Examples of suitable client devices include desktop computers 503, tablet computers 504, or laptop computers 505.

Machine learning model evaluation and testing system 510, which maybe hosted by a third party, may include a set of machine learning model evaluation and testing services 514 and a web interface server 516, coupled as shown in FIG. 5. It is to be appreciated that either or both of the services 514 and the web interface server 516 may be implemented on one or more different hardware systems and components, even though represented as singular units in FIG. 5. Machine learning model evaluation and testing services 514 may include one or more functions or operations for the processing and evaluation of a trained machine learning model and its associated training dataset.

In some embodiments, the set of applications available to a user may include one or more that perform the functions and methods described herein for machine learning model evaluation and testing. As discussed, these functions or processing workflows may be used to perform testing of an uploaded machine learning model and the dataset used to train the model, evaluation of the performance of the model in each of the tests, comparison of the model to other models, and providing the developer of the model with a report or other information regarding the outcome of the testing and evaluation.

As examples, in some embodiments, the set of model evaluation and testing applications, functions, operations or services made available through platform or system 510 may include:
  account management services 518, such as
    a process or service to authenticate a user wishing to submit a machine learning model for evaluation;
    a process or service to receive a request for evaluation of a machine learning model;
    a process or service to generate a price for the requested evaluation of a model (which could be based on the type of model, its complexity, the expected resources needed to evaluate it, etc.); and
    a process or service to generate a container or instantiation (or other form of enabling a set of model evaluation services) of the model evaluation processes for the subject model and dataset within a specific user's account;
  model and dataset conversion processes or services 519, such as
    a process or service to convert an uploaded model into a form (such as ONNX) for further testing and evaluation;
      as mentioned, this conversion may occur prior to uploading of the model by use of a processing workflow provided by the Evaluator service to a user's client device (such as in the form of a client application or separate conversion processing URL);
    a process or service to convert an uploaded set of model training data into a form (such as HDF) for further testing and evaluation;
      this conversion may occur prior to uploading of the dataset by use of a processing workflow provided by the Evaluator service to a user's client device (such as in the form of a client application or separate conversion processing URL);
  model test library and associated processes or services 520, such as
    a datastore for a set of tests that may be used in evaluating a model;
      in some embodiments, a process or processes to allow a user to select a set of tests to be used in evaluating their model;
        in some embodiments, a user may provide a new test to be used for their model;
      in some embodiments, a default set of tests selected by the provider of the Evaluator services may be used;
      in some embodiments, the tests used may be a set of tests commonly used to evaluate or characterize a model intended to perform the same task or classification process as the uploaded model;
      in some embodiments, this may include a process to discover or update the tests in the datastore or test library as the provider of the Evaluator services learns of new or improved model evaluation and testing methods;
  execute tests processes or services 521, such as
    processes or services that execute the selected and/or recommended tests on an uploaded machine learning model using the provided dataset;
  compile test results and generate report processes or services 522, such as
    a process or service to generate a report providing the results of the testing of the model and an evaluation of the model for the developer;
  send report to developer via portal processes or services 523, such as
    a process or service to provide the generated report and any accompanying information to a portal or other means of providing access to the report to the model developer; and
  administrative services 524, such as
    a process or services to enable the provider of the machine learning model testing and evaluation services and/or the platform to administer and configure the processes and services provided to requesters, such as by altering pricing models, altering workflows for processing and testing a model, adding new tests or updating existing tests, etc.

The platform or system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment of the invention may be implemented. As shown, a variety of clients 602 incorporating and/or incorporated into a variety of computing devices may communicate with a multi-tenant service platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity in order to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the ML model evaluation and testing processes described herein) are provided to users, with each business representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide specialized services and functionality to multiple users.

FIG. 7 is a diagram illustrating additional details of the elements or components of the multi-tenant distributed computing service platform of FIG. 6, in which an embodiment of the invention may be implemented. The software architecture shown in FIG. 7 represents an example of an architecture which may be used to implement an embodiment of the invention. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment of the invention may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing business related data processing and services to a user of the platform). Such function, method, process, or operation may include those used to implement one or more aspects of the inventive machine learning model testing and evaluation system and methods, such as for one or more of the processes or functions described with reference to FIGS. 1, 2, 3, 4, and 5:

- a process or service to authenticate a user wishing to submit a machine learning model for evaluation;
- a process or service to receive a request for evaluation of a machine learning model;
- a process or service to generate a price for the requested evaluation of a model (which could be based on the type of model, its complexity, the expected resources needed to evaluate it, etc.);
- a process or service to generate a container or instantiation (or other form of enabling a set of model evaluation services) of the model evaluation processes for the subject model and dataset within a specific user's account;
- a process or service to convert an uploaded model into a form (such as ONNX) for further testing and evaluation;
    - this conversion may occur prior to uploading of the model by use of a processing workflow provided by the Evaluator service to a user's client device (such as in the form of a client application or separate conversion processing URL);
- a process or service to convert an uploaded set of model training data into a form (such as HDF) for further testing and evaluation;
    - this conversion may occur prior to uploading of the dataset by use of a processing workflow provided by the Evaluator service to a user's client device (such as in the form of a client application or separate conversion processing URL);
- a datastore for a set of tests that may be used in evaluating a model;
    - in some embodiments, a process or processes to allow a user to select a set of tests to be used in evaluating their model;
        - in some embodiments, a user may provide a new test to be used for their model;
    - in some embodiments, a default set of tests selected by the provider of the Evaluator services may be used;
    - in some embodiments, the tests used may be a set of tests commonly used to evaluate or characterize a model intended to perform the same task or classification process as the uploaded model;
        - in some embodiments, this may include a process to discover or update the tests in the datastore or test library as the provider of the Evaluator services learns of new or improved model evaluation and testing methods;
- processes or services that execute the selected and/or recommended tests on an uploaded machine learning model using the provided dataset;
- a process or service to generate a report providing the results of the testing of the model and an evaluation of the model for the developer; and
- a process or service to provide the generated report and any accompanying information to a portal or other means of providing access to the report to the model developer.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further environments in which an embodiment of the invention may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

In some embodiments, certain of the methods, models or functions described herein may be embodied in the form of a trained neural network, where the network is implemented by the execution of a set of computer-executable instructions. The instructions may be stored in (or on) a non-transitory computer-readable medium and executed by a programmed processor or processing element. The specific form of the method, model or function may be used to define one or more of the operations, functions, processes, or methods used in the development or operation of a neural network, the application of a machine learning technique or techniques, or the development or implementation of an appropriate decision process. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

A machine learning model is a set of layers of connected neurons that operate to make a decision (such as a classification) regarding a sample of input data. A model is typically trained by inputting multiple examples of input data and an associated correct "response" or decision regarding each set of input data. Thus, each input data example is associated with a label or other indicator of the correct response that a properly trained model should generate. The examples and labels are input to the model for purposes of training the model. When trained (i.e., the weights connecting neurons have converged and become stable or within an acceptable amount of variation), the model will operate to respond to an input sample of data to generate a correct response or decision.

Any of the software components, processes or functions described in this application may be implemented as software code to be executed by a processor using any suitable computer language such as Python, Java, JavaScript, C++ or Per using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method for evaluating a machine learning model, comprising:
receiving a request to evaluate a machine learning model at a server operated by a provider of a machine learning model evaluation service;
receiving the machine learning model and a set of testing data from s sender of the request, wherein the testing data is to be used to evaluate the model at the server;
determining a set of one or more tests to perform to evaluate the machine learning model;
converting one or more of the machine learning model and the set of testing data to a different format than the one they are in when provided by the sender of the request;
enabling the set of tests to be performed and associated with the request, wherein the set of tests comprises one or more of generating model performance metrics, feature importance metrics, partial dependence plots, interaction metrics between different features, and descriptive statistics;
performing each test of the set of tests on the machine learning model, wherein performing a test generates an evaluation metric; and
providing each of the generated evaluation metrics to a sender of the request.

2. The method of claim 1, further comprising: authenticating the sender of the request as being authorized to use the machine learning model evaluation service; and in response to authenticating the sender of the request, providing the sender with an address of a location to upload the trained machine learning model and a set of testing data to the server.

3. The method of claim 1, wherein determining the set of tests to perform to evaluate the machine learning model further comprises one or more of:
accessing a list of tests provided by a developer of the machine learning model;
accessing a list of tests provided by a provider of the machine learning model evaluation service; or
accessing a list of tests used to evaluate a different machine learning model that is used to perform a similar task to the machine learning model being evaluated.

4. The method of claim 1, wherein the conversion of one|or both of the machine learning model and the set of testing data is performed by an application provided to the sender of the request.

5. The method of claim 1, wherein the conversion of one|or both of the machine learning model and the set of testing data is performed by a process on the server.

6. The method of claim 1, wherein the machine learning model is converted to ONNX and the set of testing data is converted to HDF.

7. The method of claim 1, wherein the generated evaluation metrics are provided to the sender in the form of one or more of a table, list, graph, or visualization.

8. The method of claim 1, wherein enabling the set of tests to be performed and associated with the request further comprises creating an instance of a process for performing each test of the set of tests within an account associated with the sender of the request.

9. A system, comprising:
an electronic processor or processors coupled to one or more non-transitory computer readable media; and the one or more non-transitory computer-readable media, wherein the non-transitory computer-readable media contains a set of computer-executable instructions, and when the electronic processor or processors are programmed with and execute the set of instructions, the system is configured to:
receive a request to evaluate a trained machine learning model;
receive the trained machine learning model and a set of testing data from a sender of the request wherein the testing data is to be used to evaluate the model:
determine a set of one or more tests to perform to evaluate the machine learning model;
convert one or more of the machine learning model and the set of testing data to a different format than the one they are in when provided by the sender of the request;
enable the set of tests to be performed and associated with the request, wherein the set of tests comprises one or more of generating model performance metrics, feature importance metrics, partial dependence plots, interaction metrics between different features, and descriptive statistics;

perform each test of the set of tests on the machine learning model, wherein performing a test generates an evaluation metric; and provide each of the generated evaluation metrics to the sender of the request.

10. The system of claim 9, wherein the system is further configured to: authenticate the sender of the request as being authorized to use the machine learning model evaluation service; and in response to authenticating the sender of the request, provide the sender with an address of a location to upload the trained machine learning model and a set of testing data.

11. The system of claim 9, wherein determining the set of tests to perform to evaluate the trained machine learning model further comprises one or more of:

accessing a list of tests provided by a developer of the machine learning model:

accessing a list of tests provided by a machine learning model evaluation service; or accessing a list of tests used to evaluate a different machine learning model that is used to perform a similar task to the machine learning model being evaluated.

12. The system of claim 9, wherein the conversion of one or both of the machine learning model and the set of data is performed by an application provided to the sender of the request.

13. The system of claim 9, wherein the conversion of one or both of the machine learning model and the set of data is performed by a server containing the electronic processor.

14. The method of claim 9, wherein the machine learning model is converted to ONNX and the set of testing data is converted to HDF.

15. The system of claim 9, wherein the generated evaluation metrics are provided to the sender in the form of one or more of a table, list, graph, or visualization.

16. The system of claim 9, wherein enabling the set of tests to be performed and associated with the request further comprises creating an instance of a process for performing each test of the set of test within an account associated with the sender of the request.

17. A set of one or more non-transitory computer-readable media comprising a set of computer-executable instructions that when executed by one or more programmed electronic processors, cause the processors or a device or apparatus in which they are contained to:

receive a request to evaluate a machine learning model:

receive the machine learning model and a set of testing data to be used to evaluate the model;

convert one or more of the machine learning model and the set of testing data to a different format than the one they are in when provided by the sender of the request;

determine a set of one or more tests to perform to evaluate the machine learning model;

enable the set of tests to be performed and associated with the request, wherein the set of tests comprises one or more of generating model performance metrics, feature importance metrics, partial dependence plots, interaction metrics between different features, and descriptive statistics;

perform each test of the set of tests on the trained machine learning model, wherein performing a test generates an evaluation metric; and provide each of the generated evaluation metrics to a sender of the request.

18. The set of one or more non-transitory computer-readable media of claim 17, wherein the set of computer-executable instructions cause the processors or a device or apparatus in which they are contained to convert the machine learning model to ONNX and the set of testing data to HDF.

* * * * *